March 6, 1951  M. RAYBIN  2,544,396
TOOTH CLEANING AND GUM MASSAGING IMPLEMENT
Filed April 14, 1950
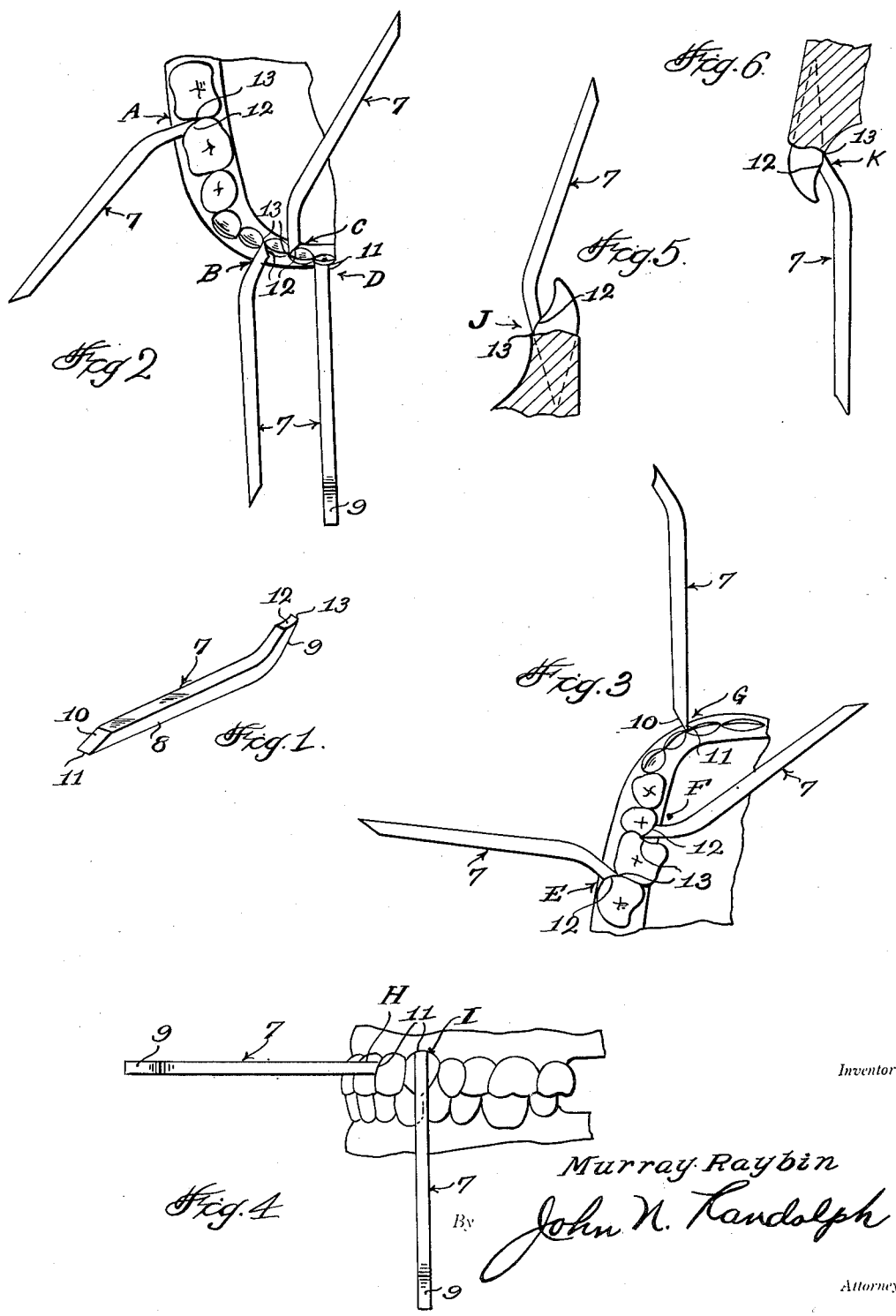
Inventor
Murray Raybin
By John N. Randolph
Attorney Patented Mar. 6, 1951

2,544,396

UNITED STATES PATENT OFFICE 2,544,396

TOOTH CLEANING AND GUM MASSAGING IMPLEMENT

Murray Raybin, Bronx, N. Y.

Application April 14, 1950, Serial No. 155,973

4 Claims. (Cl. 128—62)

This invention relates to an implement of extremely simple construction adapted for use in cleaning the teeth and massaging the gums adjacent the teeth and which is particularly constructed to reach and clean inaccessible portions of the teeth, particularly adjacent the gums to thereby serve as an adjunct to tooth brushing to complete the cleaning operation, left incomplete by the toothbrush.

Another object of the invention is to provide an implement which is particularly suited due to its construction to clean the U-shaped borders of the teeth adjacent the gum to remove unhardened or partially hardened calculus or tartar from the teeth and which is not removed by a toothbrush, to thereby prevent gum irritation and to also massage the gum, adjacent the teeth, without injury.

Other objects of the invention are to provide an implement which may be readily utilized by a person to clean his or her teeth under the free margin of the gum, to clean teeth that are irregularly aligned or spaced, to effectively clean the posterior surfaces of the last molars, to clean the concave root surfaces of teeth and to effectively reach and clean the recesses between adjacent teeth, not reached by the bristles of a toothbrush.

Various other objects and advantages of the invention will thereinafter become more fully apparent from the following description of the drawing, illustrating a preferred embodiment thereof, and wherein:

Figure 1 is a perspective view of the tooth cleaning and gum massaging implement;

Figure 2 is a fragmentary plan view of a part of the lower teeth and lower gum, showing the implement applied in a plurality of different positions;

Figure 3 is a similar view of a part of the upper teeth and gum;

Figure 4 is a side elevational view of the left half of the upper and lower teeth, showing the implement in two positions of application;

Figure 5 is a transverse sectional view through a portion of the lower, illustrating another position of the implement applied to a lower tooth; and Figure 6 is a view similar to Figure 5 but showing the implement similarly applied to an upper tooth.

Referring more specifically to the drawing, the tooth cleaning and gum massaging implement in its entirety is designated generally 7 and comprises an elongated, relatively slender stick or staff which is preferably square in cross section and which has a relatively long substantially straight end portion 8 and a shorter end portion 9 which is disposed at an oblique angle to the end portion 8. The terminal of the end portion 8, remote to the oblique portion 9, is beveled on the inner side of the stick 7 to provide a beveled surface 10, the outer edge 11 of which is straight. Likewise, the terminal of the oblique portion 9 is also beveled on its inner side to provide a beveled surface 12, likewise having a straight outer edge 13. The surfaces 10 and 12 may be beveled at different angles and the surface 12 and also, if desired, the surface 10 may be concave in a direction longitudinally of the stick, as clearly illustrated in the drawing.

Figure 2 illustrates the cleaning and massaging implement 7 in four positions of its use in cleaning the lower teeth. At A in Figure 2 the concave beveled surface 12 is shown being utilized for cleaning the outer side of a portion of the surface of a bottom tooth which faces generally toward another tooth and which tooth portion is therefore normally not accessible to a toothbrush. At B the surface 12 is shown being employed for cleaning between two front teeth and in contact with a portion of one front tooth which faces an adjacent tooth. At C in Figure 2, the implement 7 is similarly shown employed for cleaning the back surface of a front tooth and the portion thereof which faces an adjacent tooth. At D in Figure 2 the edge 11 is shown cleaning a front tooth adjacent the gum margin and in which position the beveled surface 10 may be employed to massage the U-shaped gum portion adjoining the tooth.

In Figure 3 at E the surface 12 is shown being employed with its end 13 for cleaning between two of the upper teeth on the outer surface and in the molar region. At F in Figure 2, the surface 12 is shown being utilized to clean the inner surface of an upper tooth at the bicuspid and molar region, while at G, the straight edge 11 is shown employed for cleaning between two of the upper front teeth and from the front surface thereof.

In Figure 4 at H the beveled surface 10 and edge 11 are shown employed for cleaning the outer surface of an upper front tooth and between two of the front teeth, which operations will obviously be performed simultaneously. At I in Figure 4, the surface 10 and edge 11 are shown being employed for cleaning the outer side of an upper tooth and for removing the tartar or calculus from the U-shaped border of the tooth at the neck of the tooth and along the gum margin and which likewise constitutes a massaging action on the gum.

In Figure 5 at J the beveled surface 12 is shown being utilized to clean the lower inner surface of a lower tooth and with its edge 13 cleaning the calculus or tartar from the neck of the tooth along the gum margin and at the same time massaging the adjacent gum portion. Figure 6 shows the surface 12 and edge 13 being similarly employed at K in connection with the inner side of an upper tooth.

The implement 7 is preferably but not necessarily formed of a medium hard wood such as poplar or birch and it will be readily apparent that it affords an inexpensive implement which may be readily used by a person as an adjunct to a toothbrush in effectively cleaning otherwise inaccessible portions of the teeth, massaging the gums and removing tartar or calculus before it has an opportunity to harden at the neck of the teeth and cause irritation to the gums.

Various modifications and changes are contemplated and may obviously be resorted to, without departing from the spirit or scope of the invention as hereinafter defined by the appended claims.

I claim as my invention:

1. A tooth cleaning and gum massaging implement comprising a stick having a relatively long substantially straight end and a shorter end disposed at an oblique angle to the straight end, said shorter end being substantially square in cross section and having a terminal portion beveled on the inner side of the stick to provide a tooth and gum engaging surface.

2. An implement as in claim 1, said stick having a straight edge at the outer end of the beveled surface for engaging the teeth and adjoining portions of the gums.

3. An implement as in claim 1, said beveled surface being concave in a direction longitudinally of the stick.

4. A tooth cleaning and gum massaging implement comprising a stick having a relatively long substantially straight end portion forming a handle, the opposite end of said stick being disposed at an obtuse angle to said first mentioned handle end and being substantially square in cross section, the terminal of said last mentioned stick end being beveled on its inner side to provide a tooth cleaning and gum massaging surface.

MURRAY RAYBIN.

REFERENCES CITED

The following references are of record in the file of this patent:

UNITED STATES PATENTS

| Number | Name | Date |
| --- | --- | --- |
| 864,054 | Abrams | Aug. 20, 1907 |
| 1,002,468 | Strangman | Sept. 5, 1911 |
| 2,016,597 | Drake | Oct. 8, 1935 |
| 2,253,210 | Psiharis | Aug. 19, 1941 |